United States Patent

Child

[11] Patent Number: 5,487,631
[45] Date of Patent: Jan. 30, 1996

[54] MACHINE TOOLS

[75] Inventor: Robin E. Child, Leamington Spa, Great Britain

[73] Assignee: Systematic Drill Head Co. Ltd., Warwickshire, United Kingdom

[21] Appl. No.: 244,178

[22] PCT Filed: Aug. 23, 1993

[86] PCT No.: PCT/GB93/01791

§ 371 Date: May 18, 1994

§ 102(e) Date: May 18, 1994

[87] PCT Pub. No.: WO94/07061

PCT Pub. Date: Mar. 31, 1994

[30] Foreign Application Priority Data

Sep. 19, 1992 [GB] United Kingdom ............... 9219873

[51] Int. Cl.⁶ .................................................. B23Q 11/12
[52] U.S. Cl. ................................................ 409/231; 409/135
[58] Field of Search .................................... 409/231, 134, 409/135

[56] References Cited

U.S. PATENT DOCUMENTS 5,290,130  3/1994  Beretta ........................... 409/231

FOREIGN PATENT DOCUMENTS

| 3438755 | 4/1986 | Germany . | |
| 24009 | 1/1990 | Japan | 409/231 |
| 166038 | 7/1991 | Japan | 409/134 |
| 101747 | 4/1992 | Japan | 409/135 |

*Primary Examiner*—Daniel W. Howell
*Attorney, Agent, or Firm*—Learman & McCulloch

[57] ABSTRACT

The bearing of a machine tool spindle is sealed by a pair of wiping seals mounted on the shaft and resiliently urged into contact with opposite faces of a stationary ring through which the shaft extends. The very small clearance between the ring and the shaft is fed with gas for example air at low pressure. When there is no gas supply and for example when the shaft is stationary the seals contact the ring and the resilience ensures good contact and prevents seepage of for example lubricant along the shaft from one side of the seals to the other. When the shaft is to be driven, low pressure gas is supplied and this pressure deflects the seals to lift them from the face of the ring so that there is no frictional engagement and either power loss or heat generation, and any liquid which does go past the seals is thrown outwardly by centrifugal force and driven by the escaping gas.

13 Claims, 1 Drawing Sheet

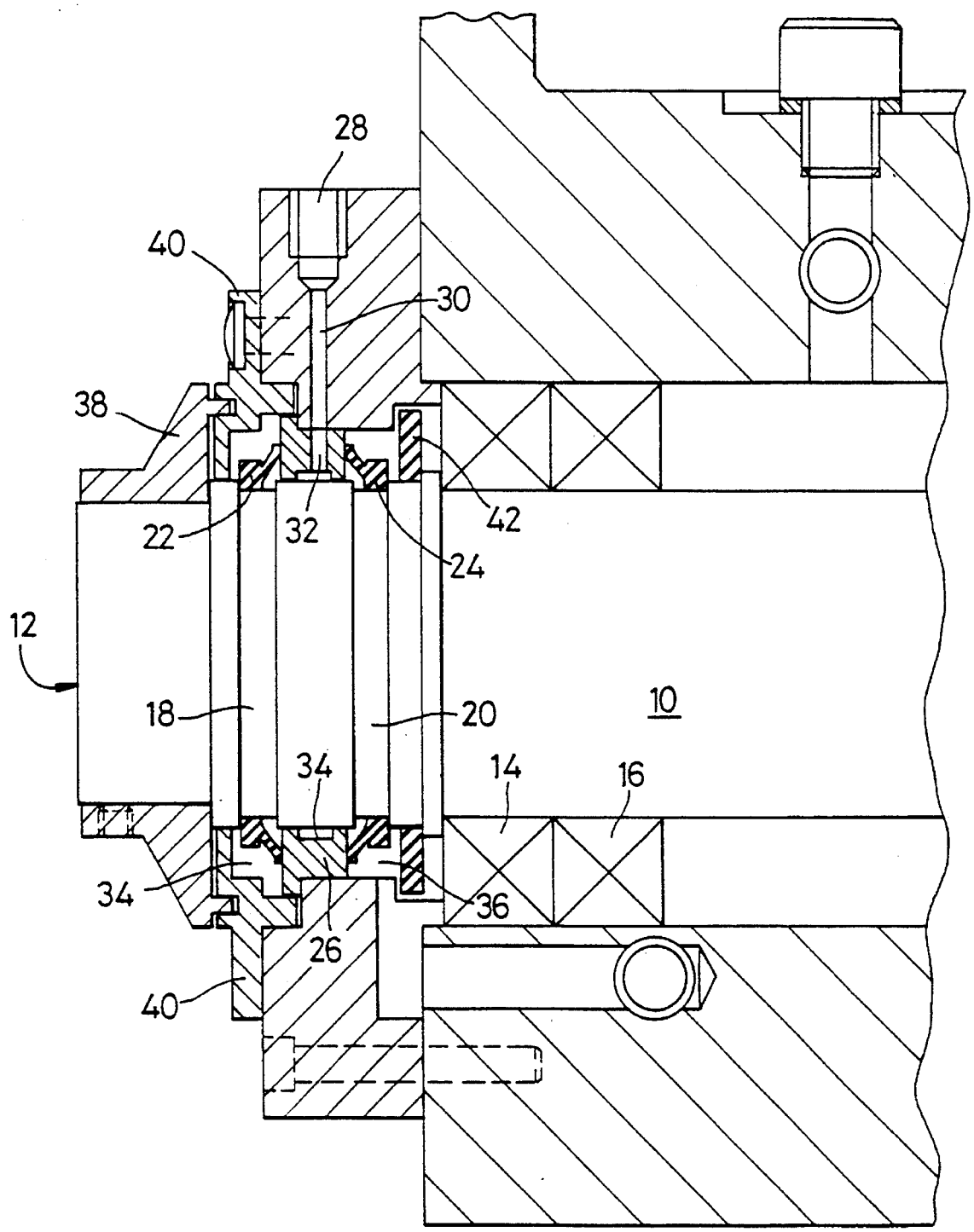

MACHINE TOOLS

This invention relates to machine tool spindles which support a cutting tool at one end and are journalled in bearings.

BACKGROUND OF THE INVENTION

It is conventional to supply a coolant/rinsing fluid, such as suds, to a tool and it is important to prevent that fluid from reaching the bearings. It also is conventional to supply lubricant to the bearings and it also is desirable to prevent that lubricant leaking externally. So one or more seals are interposed between the bearings and cutting tool. This creates problems.

It is usual to employ wiping seals which maintain contact between rotating and non-rotating parts even when the rotation ceases. The wiping seal has to be resiliently held in place. It is known to use so-called V-rings which comprise a ring to fit tightly on the spindle and an integral radial flange, made from a slightly resilient material such as a suitable plastic or rubber. However, the wiping creates friction, which leads to temperature increase and this can lead to inaccuracy in the machining operation because the spindle center positions will vary between cold and hot dimensions. Sometimes the shaft needs to be locally hardened or provided with for example ceramic surfaces as a seal component and to reduce wear and that also is expensive.

Labyrinth seals are often employed to avoid friction and its consequent heat and wear but multiple component labyrinths complicate the design, increase expense, and require additional length which is a disadvantage in many designs.

Another well known seal system employs radially extending flanges freely located so that liquid—lubricant or coolant—creeping along the spindle will reach the flange and be thrown off by centrifugal force into an annular collector space. But these, like labyrinth seals are primarily and sometimes exclusively useful when the spindle is in use. When stopped for any reason, undesired flow can occur from liquids already in place.

So the object of the invention is to provide an improved and simplified design.

SUMMARY OF THE INVENTION

According to the invention, a machine tool spindle comprises at least one wiping seal between the spindle and a fixed non-rotating part arranged to be displaced from contact with the said fixed part by an applied fluid pressure so as to avoid friction when so displaced.

The applied fluid pressure may be a purging gas The effect of the purging gas may be not only to displace the parts to a non-contacting and hence non-friction position, but also to enable the flange to be used to throw off fluid by centrifugal force, and drain passages may be provided for such fluids.

Hence, when there is no purge gas the seal is a contact seal. When there is purge gas, the gas flow will prevent liquid flow in the counter-current direction through the seal, and when there is purge gas and spindle (including the seal) rotation, the seal can act to throw off liquid which reaches it.

Preferably a pair of such seals are arranged to contact opposite faces of a common fixed component through which the purge gas is fed and these may be oppositely inclined to form a V shape. The gas may be air.

THE DRAWINGS

One presently preferred embodiment of the invention is now more particularly described with reference to the accompanying drawing wherein the sole figure is a fragmentary sectional elevation of a single spindle assembly. Those skilled in the machine tool art will recognise that multi-spindle assemblies are usual, and will realise that the invention may be employed on each and all of them.

DETAILED DESCRIPTION

In the drawing, the spindle is indicated by the reference numeral 10 and end 12 is adapted in known manner (not shown) to carry the cutting tool (aot shown). Bearings, diagrammatically indicated by the references 14, 16, journal the spindle in support structure of the assembly for rotation about the longitudinal axis of the spindle.

In this embodiment the spindle has a pair of shallow peripheral grooves 18, 20. Each groove supports a V-ring 22, 24 comprising a ring unitary with a radial flange or legs which is inclined, i.e. the flange is a frusto-cone. The V-ring is made of a slightly resilient and slightly flexible synthetic resin as mentioned. The shape of the ring part cooperates with the corresponding groove to provide axial location. The resilience allows assembly by stretching (ring enlargement) to pass over the larger diameter portion of the spindle and then elastic recovery snaps the ring into the groove.

The spindle extends through a fixed stationary annular component 26 of the spindle support structure which encircles the spindle and has a small clearance between its bore and the spindle. The parallel faces of the fixed component form longitudinally spaced wiping or sealing surfaces or faces transverse to the rotational axis of the spindle which the two V-rings contact resiliently when stationary.

Air at a suitable pressure is supplied by a port 28 to flow through passages 30 32 and reach an annular plenum chamber formed by a rebate or annular groove 34 in component 26 and then to flow axially in both directions through the small clearance and this deflects both flanges against their resilience so that they become slightly spaced from the component 26. This is done when the spindle is rotated. Consequently the lips of the seals make contact only when there is no air and when air is supplied and the spindle is rotated there is no friction.

The required air pressure depends upon the flinger characteristics, for example flexibility and resilience, but values as low as 0.042 kg/sq.cm (0.6 psi) have been found effective experimentally and a value of 0.14 kg sq.cm (2 psi) is typical.

When in operation it will be appreciated that the cutting fluid is flung and blown from the ring 22 and lubricant from ring 24. In each case the effect is to throw the liquid to the outer and stationary wall of a collector chamber 34, 36 for drainage through ports at the bottom of the chambers.

The drawing also shows a plate 40 and a further flinger disc 42 which protect the resilient material from direct impact by high velocity fluids.

A further front metallic flinger 38 with labyrinth seal to plate 40 is shown but at present is thought to be unnecessary to the fundamental operation of the invention.

I claim:

1. A machine tool spindle assembly comprising a rotatable spindle; a pair of resilient wiping seals; a fixed, non-rotatable component encircling said spindle, said seals being mounted on said spindle for rotation therewith and making sealing engagement with opposite faces of said component when said spindle is at rest; and means for applying pressure fluid to said wiping seals so as to effect displacement of said seals from engagement with said component.

2. The assembly of claim 1 wherein said pressure fluid is a purging gas.

3. The assembly of claim 2 wherein said gas is air.

4. The assembly of claim 2 wherein said means for applying pressure fluid comprises passages in said non-rotatable component.

5. A machine tool spindle assembly comprising a spindle; means journaling said spindle for rotation about an axis; a fixed component encircling said spindle and having a pair of axially spaced, annular sealing faces extending transversely of said axis; a pair of axially spaced, resilient, annular seal members carried by said spindle on opposite sides of said fixed component and biased toward sealing contact with the adjacent one of said sealing faces; and fluid passage means communicating with the space between said seal members for delivering fluid under pressure to said space and in such direction as to displace each of said seal members out of contact with said sealing faces.

6. The assembly of claim 5 wherein said fluid passage means extends through said fixed component.

7. The assembly of claim 5 wherein said fluid passage means includes an annular plenum chamber between said spindle and said fixed component.

8. The assembly of claim 7 wherein said plenum chamber comprises an annular groove in said fixed component.

9. The assembly of claim 7 wherein said spindle is spaced radially from said fixed component to provide clearance for the passage of fluid from said chamber to the space between said seal members.

10. The assembly of claim 5 including a pair of fluid collection chambers adjacent said seal members for collecting fluid thrown from said seal members by centrifugal force during rotation of said spindle.

11. The assembly of claim 10 wherein said collection chambers include radially extending vent passages for the escape of said fluid from said chambers.

12. The assembly of claim 5 wherein each of said seal members has a flange portion inclined toward its associated sealing face and providing said sealing contact therewith when said spindle is at rest.

13. A machine tool spindle assembly comprising a spindle; means journaling said spindle for rotation about an axis; a pair of resilient, annular seal members carried by said spindle for rotation therewith, said seal members having an axial space therebetween; a fixed component encircling said spindle and interposed between said seal members, said component having two seal faces one of which confronts one of said seal members and the other of which confronts the other of said seal members; each of said seal members having a flange inclined toward and engaging the adjacent seal face of said component when said spindle is at rest; and fluid passage means in communication with the space between said seal members for delivering into said space fluid under sufficient pressure to effect deflection of the flanges of said seal members out of engagement with the adjacent seal faces.

* * * * *